(12) United States Patent
Zhuang et al.

(10) Patent No.: US 11,511,191 B2
(45) Date of Patent: Nov. 29, 2022

(54) INTERACTIVE CONTROL SYSTEM AND METHOD FOR GAME OBJECTS, SERVER AND COMPUTER-READABLE STORAGE MEDIUM

(71) Applicant: SHANGHAI LILITH TECHNOLOGY CORPORATION, Shanghai (CN)

(72) Inventors: Ganlin Zhuang, Shanghai (CN); Yifan Mao, Shanghai (CN); Huan Jin, Shanghai (CN)

(73) Assignee: SHANGHAI LILITH TECHNOLOGY CORPORATION, Shanghai (CN)

( * ) Notice: Subject to any disclaimer, the term of this patent is extended or adjusted under 35 U.S.C. 154(b) by 0 days.

(21) Appl. No.: 17/627,974

(22) PCT Filed: Aug. 5, 2020

(86) PCT No.: PCT/CN2020/106929
§ 371 (c)(1),
(2) Date: Jan. 18, 2022

(87) PCT Pub. No.: WO2022/027262
PCT Pub. Date: Feb. 10, 2022

(65) Prior Publication Data
US 2022/0266144 A1 Aug. 25, 2022

(51) Int. Cl.
*A63F 13/577* (2014.01)
*A63F 13/55* (2014.01)
*A63F 13/56* (2014.01)

(52) U.S. Cl.
CPC ............ *A63F 13/577* (2014.09); *A63F 13/55* (2014.09); *A63F 13/56* (2014.09); *A63F 2300/643* (2013.01); *A63F 2300/646* (2013.01)

(58) Field of Classification Search
CPC ........ A63F 13/577; A63F 13/55; A63F 13/56; A63F 13/57; A63F 2300/64; A63F 2300/643; A63F 2300/646
(Continued)

(56) References Cited

U.S. PATENT DOCUMENTS 8,223,144 B2 * 7/2012 Ishiwata ................. G06T 19/00
345/475
8,797,348 B2 * 8/2014 Tsuda ..................... G06F 16/50
345/619

(Continued)

FOREIGN PATENT DOCUMENTS

CN 105056528 A 11/2015
CN 107185242 A 9/2017
(Continued)

OTHER PUBLICATIONS

Int'l Search Report for PCT/CN2020/106929, dated Apr. 30, 2021 (3 pages).

(Continued)

*Primary Examiner* — Allen Chan
(74) *Attorney, Agent, or Firm* — Thomas Spath

(57) ABSTRACT

An interactive control system for a game object including: a collision module, configured to assign a collision attribute to each game object; a moving module, configured to receive a moving instruction directed to a game group; an interaction module, configured to be coupled to the collision module, calculate a repulsive force of each game object, and represent an interaction form of the game object based on the repulsive force, wherein, when the game group is moved to the moving target, makes a group circle with a center of the game group as a center of the circle and a first length as a radius, when the game object is outside the group circle, it controls the collision module to impart a restoring force (Continued)

directing to the center of the circle to the game object, so as to control the game object to return to the game group.

14 Claims, 2 Drawing Sheets

(58) Field of Classification Search
USPC .......................................................... 463/31
See application file for complete search history.

(56) References Cited

U.S. PATENT DOCUMENTS

| | | | | |
|---|---|---|---|---|
| 9,971,492 B2* | 5/2018 | Chandler | ............... | G06F 3/0485 |
| 2006/0258448 A1* | 11/2006 | Ishibashi | ................. | A63F 13/56 |
| | | | | 463/31 |
| 2017/0144072 A1* | 5/2017 | Onishi | .................. | A63F 13/847 |
| 2020/0338451 A1* | 10/2020 | Wang | ................. | A63F 13/2145 |

FOREIGN PATENT DOCUMENTS

| | | |
|---|---|---|
| CN | 108744507 A | 11/2018 |
| CN | 110302530 A | 10/2019 |
| CN | 110812838 A | 2/2020 |

OTHER PUBLICATIONS

Written Opinion for PCT/CN2020/106929, dated Apr. 30, 2021 (5 pages).

* cited by examiner

INTERACTIVE CONTROL SYSTEM AND METHOD FOR GAME OBJECTS, SERVER AND COMPUTER-READABLE STORAGE MEDIUM

TECHNICAL FIELD

The present disclosure relates to software, in particular to an interactive control system and method for game objects, a server and a computer-readable storage medium.

BACKGROUND

With the improvement of people's living standards, the need for entertainment options is increasing. Therefore, games have become the choice of many people after work and bring themselves amusement.

A game usually comprises game objects used as control objects of users. In order to simulate authenticity of the game objects, movement and action of the game objects conform to actual physical laws as much as possible. For example, in a strategy wargame, the game objects are combat troops. A combat experience that takes place on a large map uses the troops as a base carrier. A combat performance and a logical calculation are performed with each troop as a carrier. The combat troop refers to an arm group that can be directly controlled by a player. Each troop can include a plurality of units, and each troop has an integrity attribute. When a battle occurs between the troops, the combat performance between the troops often shows a phenomenon of interlacing or clipping that occurs between the inner units of the troops. When this phenomenon occurs, the combat performance does not conform to the actual situation and game experience of the users is reduced. In addition, the battle process is not realistic enough, and the user experience is further reduced when game applications are used by the users.

Therefore, there is a need for a new interactive control system for game objects in which a real and independent collision parameter can be assigned to each combat unit in the troop, and a more realistic application experience can be brought to the users.

SUMMARY

To overcome the above technical defects, an object of the present disclosure is to provide an interactive control system and method for game objects, a server, and a computer-readable storage medium, so that user experience is more realistic, and the combat performance and logic of the game objects are more immersive.

The present disclosure discloses an interactive control system for game objects, used to control interaction of at least one game group including at least two game objects, where the interactive control system includes: a collision module, configured to assign a collision attribute to each game object, wherein the collision attribute comprises at least one or more of a deformation size, mass, a radius, and a repulsion coefficient of the game object; a moving module, configured to receive a moving instruction directed to a game group, and move the game group towards a moving target; and an interaction module, configured to be coupled to the collision module, calculate a repulsive force of each game object based on the collision attribute, and represent an interaction form of the game objects based on the repulsive force, and configured to be coupled to the moving module, wherein, when the game group is moved to the moving target, makes a group circle with a center of the game group as a center of the circle and a first length as a radius, when the game object is outside the group circle, it controls the collision module to impart a restoring force directing to the center of the circle to the game object, so as to control the game object to return to the game group.

Preferably, the interaction module calculates the repulsive force according to the following formula: repulsive force=deformation size*repulsion coefficient*direction/mass, wherein the deformation size is a value of contour deformation generated when contours of different game objects are in contact; the repulsion coefficient is repulsion performance of each game object; and the mass is mass of a relative game object that is in contact with the game object.

Preferably, the interaction module calculates a first repulsive force between each game object and other game objects in the same game group, and a second repulsive force between each game object and game objects in a different game group, and calculates a resultant repulsive force based on the first repulsive force and the second repulsive force; and the interaction module simulates, when representing the interaction form of the game objects according to the resultant repulsive force, movements of the game objects under the resultant repulsive force, so that the game objects in the same game group or in different game groups do not clip through each other.

Preferably, the interactive control system further includes: a combat module, configured to receive an attack instruction directed to an attacking game group and an attacked game group, and control the attacking game group to fight with the attacked game group, wherein the combat module randomly or directionally selects a game object in the attacked game group as an object of attack for each game object in the attacking game group; and the interaction module is coupled to the combat module, receives a relationship between the objects of attack, provides a combat interactive performance, and sends the combat interactive performance to at least one client for display.

Preferably, the combat interactive performance includes one or more of attack actions, special effects, attacked actions, and damage data of the game object; and when the combat module directionally selects at least two game objects in the attacked game group as objects of attack for the game objects in the attacking game group, the combat interactive performance further includes an attack radius.

Preferably, the interactive control system further includes: a compensation module, configured to obtain an upper limit of objects of each game group and a current number of the game objects, and when the current number is less than the upper limit of objects, the compensation module controls an object center having the game objects to compensate the game objects for the game group.

The present disclosure further discloses an interactive control method for game objects, used to control interaction of at least one game group including at least two game objects, where the interactive control method includes the following steps: assigning, by a collision module, a collision attribute to each game object, wherein the collision attribute comprises at least one or more of mass, a radius, and a repulsion coefficient of the game object; receiving, by a moving module, a moving instruction directed to the game group, and moving the game group towards a moving target; calculating, by an interaction module, a repulsive force of each game object based on the collision attribute, and representing an interaction form of the game objects based on the repulsive force; when the game group is moved to the moving target, making, by the interaction module, a group circle with a center of the game group as a center of the circle and a first length as a radius, when the game object is outside the group circle, it controls the collision module to impart a restoring force directing to the center of the circle to the game object, so as to control the game object to return to the game group The present disclosure further discloses a server, including an interactive control system.

The present disclosure further discloses a computer-readable storage medium having a computer program stored thereon, and when the computer program is executed by a processor, the processor implements the steps.

Compared with the prior art, the above technical solutions have the following beneficial effects:

1. Multiple game objects in the game group each have a physical model and a collision parameter, and battle scenes in which multiple game groups fight are realistic and clipping does not occur.

2. A movement mode similar to the movement of a flock of birds imparts a more realistic marching experience of the game groups to users.

3. The battle scenes are sent from a server to a client in real time, and played by the client in real time. Even in the scene with multi-player operation, the performance is stable and frame freezing does not occur;

4. The mechanism of compensating the game objects for the game group in real time allows users to control the game group more freely.

DETAILED DESCRIPTION

Figure 1:
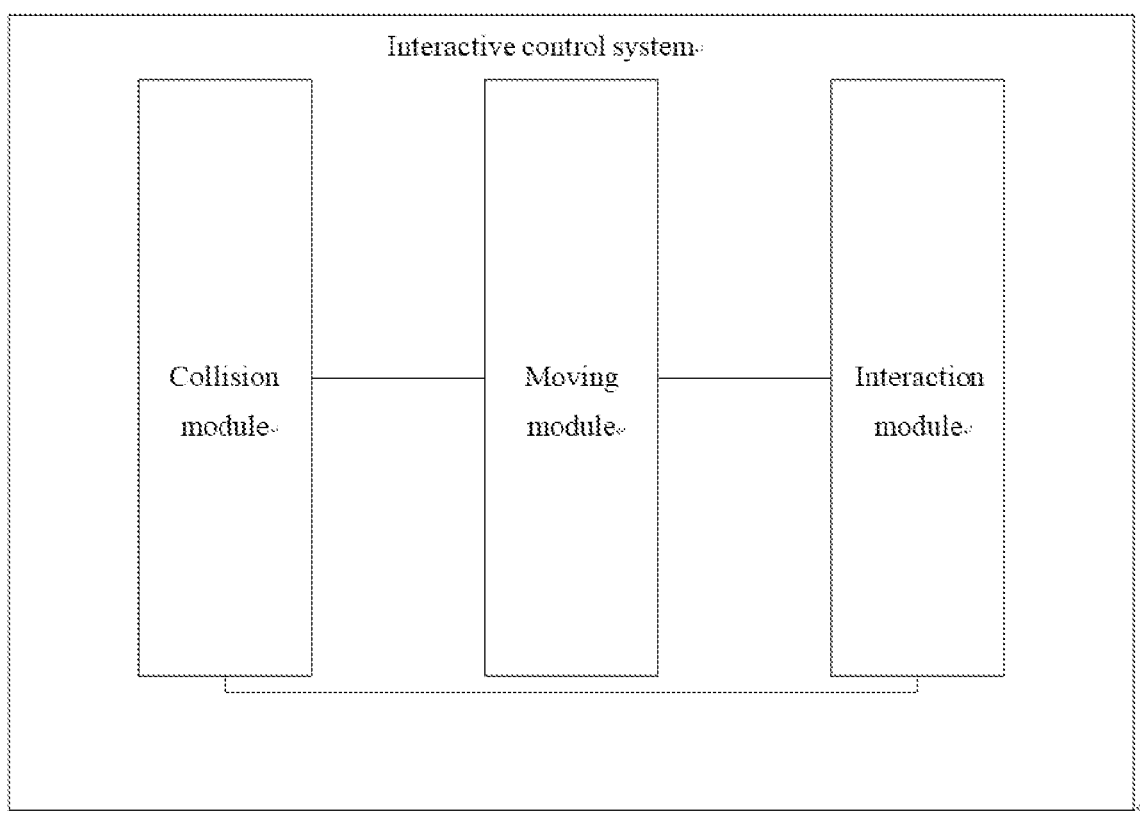
FIG. 1 is a schematic structural diagram of an interactive control system for game objects according to a preferred embodiment of the present disclosure.

The advantages of the present disclosure are further described below with reference to drawings and embodiments.

The exemplary embodiments are described in detail herein, and examples thereof are shown in the drawings. When the following description involves the drawings, unless stated otherwise, the same numbers in different drawings indicate the same or similar elements. The implementations described in the following exemplary embodiments do not represent all implementations consistent with the present disclosure. Rather, the implementations are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" used in the present disclosure and appended claims are also intended to include plural forms, unless it clearly states other meanings in the context. It should also be understood that the term "and/or" as used herein refers to and includes any or all possible combinations of one or more associated listed items.

It should be understood that although the terms "first", "second", "third", etc. may be used in this disclosure to describe various information, the information should not be limited to these terms. These terms are only used to distinguish the same type of information from each other. For example, without departing from the scope of the present disclosure, first information may also be referred to as second information, and similarly, second information may also be referred to as first information. Depending on the context, the word "if" as used herein can be interpreted as "while" or "when" or "in response to determining."

In the description of the present disclosure, it should be understood that the orientation or positional relationship indicated by the terms "longitudinal", "lateral", "upper", "lower", "front", "rear", "left", "right", "vertical", "horizontal", "top", "bottom", "inner", "outer", etc. are the orientation or positional relationship shown in the drawings, and are only for the convenience of describing the present disclosure and simplifying the description, instead of indicating or implying that the related device or element must have a specific orientation, be constructed and operated in a specific orientation, and therefore cannot be understood as a limitation of the present disclosure.

In the description of the present disclosure, unless otherwise specified and limited, it should be noted that the terms "installed", "connection", and "coupled" should be understood in a broad sense. For example, it may be mechanical connection or electrical connection, or may be internal connection between two elements, or may be direct connection, or may be indirect connection through an intermediate medium. For a person of ordinary skill in the art, the specific meaning of the above terms can be understood according to specific circumstances.

In the following description, the use of suffixes such as "module", "component" or "unit" for indicating elements is only for the purpose of facilitating the description of the present disclosure, and has no specific meaning in itself. Therefore, the "module" and the "component" can be exchanged.

Referring to FIG. 1, FIG. 1 is a schematic structural diagram of an interactive control system for game objects according to a preferred embodiment of the present disclosure. In this embodiment, the interactive control system is used to change a representing manner of the game object received when a user uses a smart terminal or a client, that is, to control interaction of at least one game group including at least two game objects. Specifically, the interactive control system includes:

Collision Module

The collision module is a module that is provided in the interactive control system to limit and simulate physical performance of the game objects, so that the game objects interact according to expectations of a game application program designer during movement. Therefore, the collision module is associated with and directed to each game object, and assigns a collision attribute to each game object. The collision attribute determines physical performance of the game object. For example, when the collision attribute is that an actual physical model of the game object is smaller than an interactive contour of the game object, the user finds that a portion of a model of a game object overlaps with a portion of a model of another game object when moving the game object. When the collision attribute is that the actual physical model is larger than the interactive contour of the game object, when moving the game objects, the user finds that, when another game object is approaching the game object, performances such as deformation and retreat due to collision occur in the actual scene. That is, changes of the collision attributes assigned to the game objects by the collision module cause different interactive performances of the game objects. Specifically, the collision attribute includes at least one or more of a deformation size, mass, a radius, and a repulsion coefficient of the game object.

Moving Module

The moving module is a module that is provided in the interactive control system and is used to send an instruction to move the game object. The moving module is coupled to a module that can receive a user operation, such as a display module. The moving module identifies the user operation on the display module, and moves the game object towards a moving target according to the moving instruction directed to the game group. That is, during movement, a position in a stationary state is a starting point of movement of the game object, and a final position in the moving instruction from the user is a desired moving target.

Interaction Module

The interactive control system further includes an interaction module coupled to the collision module. For the collision attribute assigned to the game object by the collision module, a repulsive force of each game object based on the collision attribute is calculated. The repulsive force is a force that is exerted by a game object on another game object that is close to and in contact with the game object and that is opposite to a moving direction of the another game object, that is, a force of pushing the another game object outward. With the repulsive force, it can prevent clipping between the game objects. It can be understood that the configuration of the collision attribute in existing strategy game application programs is limited to the game group, and cannot be refined to the individual game objects in the game group. However, in this embodiment, after the interaction module calculates the repulsive force of each game object, it represents an interaction form of each game object based on the repulsive force of each game object. For example, when game objects in the same game group approach during movement, based on the repulsive force, the game objects are separated (the greater the repulsive force, or the greater the distance to generate the repulsive force, the farther the game objects are separated, and vice versa). Further, the interaction module is coupled to the moving module, and sends an instruction to the moving module to inform the moving module of the interaction mode that the game object should exhibit during the movement of the game object. In order to more realistically show the same appearance as the actual troop marching, when the game group is moving, the game objects within the game group move at different speeds. As a result, when the game group reaches the moving target, some game objects may have reached the moving target, while some game objects are still in the process of moving. In this regard, when one or more game objects reach the moving target, firstly, it is considered that the game group has reached the moving target, and then a group circle is made by taking a center of the game group (such as a center of all the game objects that have reached, or an inherent center of the game group) as a circle center, and a first length (which can be greater than or equal to the maximum width of the original game group, depending on the dense arrangement of the game objects) as a radius. In this case, for the game objects outside the group circle, an instruction is assigned by the interaction module to the collision module to control the collision module to send an instruction to the game object for applying a restoring force towards the circle center, thereby speeding up to control the game objects to return to the game group. With this configuration, the game objects in the game group can follow a bird swarm algorithm to simulate a movement trajectory of a bird swarm, which is more in line with the state of marching in reality. In addition, by setting the restoring force, it is ensured that all game objects in the game group maintain the same gathered state before and after the movement.

After adopting the above technical solution, each game object has an independent collision design, and there is no interactive performance of clipping between the game objects in the same game group, or different game objects clip through each other when different game groups move or attack.

In a preferred embodiment, the interaction module calculates the repulsive force between the game objects according to the following formula:

$$\text{Repulsive force} = \text{deformation size} * \text{repulsion coefficient} * \text{direction} / \text{mass}$$

For example, when a game object A and a game object B each have their own repulsive forces, due to opponent's repulsive force and the movement relationship of being close to each other, in order to simulate the interaction performances of the game object A and the game object B due to opponent's repulsive forces, in the above formula, the deformation size is the change in the shapes of the game object A and the game object B when they are subjected to external forces. When the game object A and the game object B collide with each other, the deformation sizes generated on the game object A and the game object B are the same. However, due to the repulsion coefficient, when a model represented by a game object is closer to a rigid body, the repulsive force generated by the model against an opponent is greater, such as a tank or a chariot, and when a model represented by a game object is formed by an object with less rigidity, the repulsive force generated by the model against an opponent is smaller, such as an infantry or a cavalry. The repulsion coefficient is used to describe the rigidity of the game object. With the above calculation formula of repulsive force, it can indicate tanks that can generate large repulsive forces with small deformations and are difficult to push with large masses, and infantry that can generate repulsive forces effectively with large deformations and can be easily pushed with small masses and are agile.

In another preferred embodiment, the interaction module further calculates the repulsive force between game objects in the same game group, that is, a first repulsive force, and the repulsive force between different game objects in different game groups, that is, a second repulsive force. After the above two repulsive forces are calculated, a resultant repulsive force of the two is calculated according to the first repulsive force and the second repulsive force that are generated. For example, when the first repulsive force is a force of a game object away from a center of a game group where the game object is located, and the second repulsive force is a force of a game object towards a center of a game group where the game object is located, and when the second repulsive force is greater than the first repulsive force, the game object moves towards the center of the game group where the game object is located. For example, when the first repulsive force is a force of a game object moving away from a center of a game group where the game object is located, and the second repulsive force is a force tangential to a side edge of the game group, the game object moves in an oblique direction, which is almost completely consistent with a collision in the real situation. That is, when representing the interaction form of the game objects, the interaction module simulates the movement of the game objects under the resultant repulsive force according to the resultant repulsive force, so that the game objects in the same game group or in different game groups do not clip through each other.

In another preferred embodiment, the interactive control system further includes:

Combat Module

The combat module receives an attack instruction. The attack instruction includes an attacking game group and an attacked game group. The attacking game group is a game group that launches an attack, and the attacked game group is a game group that is attacked. The combat module controls the attacking game group to fight against the attacked game group according to the attack instruction. During the battle, the combat module randomly or directionally selects a game object in the attacked game group as an object of attack for each game object in the attacking game group. Randomly selecting, in another words an object of attack is random, provides randomness for game application programs. Directionally selecting means directionally attacking an opponent to achieve the best attack effect (the directionally selecting logic may be a pre-configured restraint relationship, etc.) In addition, during the battle, the interaction module is coupled to the combat module to receive the relationship between the objects of attack in the two groups and provide a combat interactive performance. For example, the combat module is represented in the form of a combat server, and synchronizes the results of the battle data to at least one client coupled to the battle server at intervals, such as 0.1 seconds, 0.25 seconds, etc. Each client plays the corresponding combat interactive performance for the selected game group, such as attacking actions, special effects, attacked actions, floating word of damage, or death effects. Further, for example, each game object also has an independent health points to display a property that is capable of continuing to be active.

It can be understood that since the game object may have a group damage effect, that is, when the combat module directionally selects at least two game objects in the attacked game object group as objects of attack for the attacking game object, the combat interactive performance also includes an attack radius of the game object. All attacked game objects within the attack radius will be attacked. Further, attacking damage that can be caused by the attacking game object in the attacking game group is calculated in the following manner:

Damage=Single shot damage (weapon)*[(attacking radius (bullet)/radius constant)^2]

In the above formula, the radius constant is pre-configured data, or a proportion of the attacked game objects to the attacked game groups.

The attack damage received by all attacked game objects within the attack radius can be calculated by the following formula:

Actual damage=group damage output by the attacking game object (single shot bullet)/(1+resistance to explosive damage of the attacked game object/AOE resistance constant).

In another preferred or optional embodiment, the interactive control system further includes:

Compensation Module

The compensation module is provided in the interactive control system, and obtains an upper limit of objects of each game group and the current number of game objects. For example, in a combat game application program, the upper limit of objects is the maximum number of infantries, cavalries, etc. in the army. The current number is the number of infantries and cavalries currently in the army. When the current number is less than the upper limit of objects, the compensation module controls an object center having the game object to compensate the game object for the game group, that is, in the process of movement of the game group, if the number of game objects in the game group does not reach the upper limit, a base to which the game group belongs move game objects whose number is the same as the difference value between the two (which needs to be generated first) to the corresponding game group, and then the game objects reach the game group and enter the game group, and participate in the following movement and battles. In other words, if there is attrition in the game group, the base is made to compensate the game objects for the game group immediately. As a result, the user has more freedom to control the game group, and a high degree of freedom experience is imparted to the user.

Figure 2:
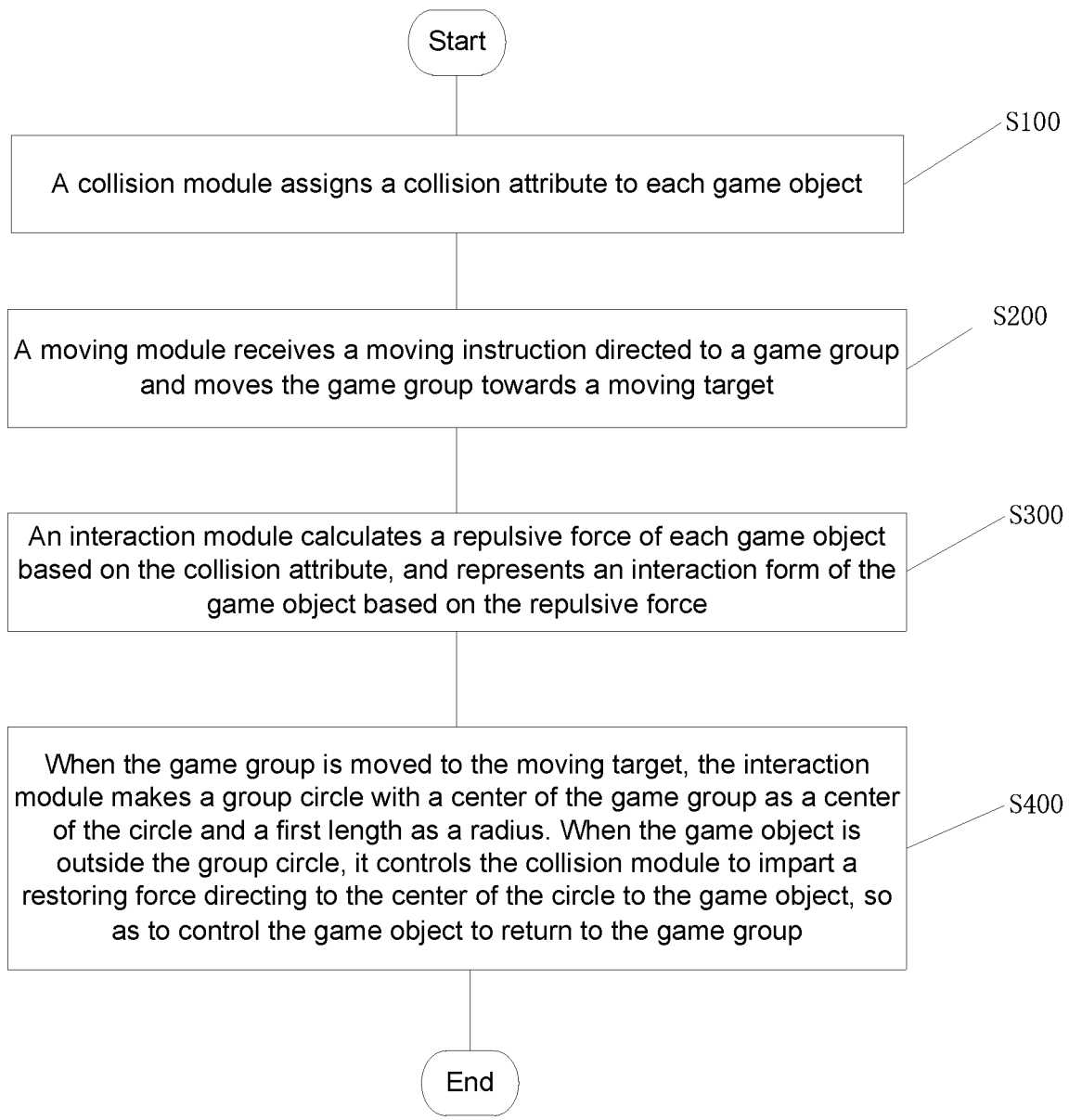
FIG. 2 is a schematic flowchart of an interactive control method for game objects according to a preferred embodiment of the present disclosure.

Referring to FIG. 2, the present disclosure further shows an interactive control method for game objects, used to control interaction of at least one game group including at least two game objects, wherein the interactive control method includes the following steps:

S100: A collision module assigns a collision attribute to each game object. The collision attribute includes at least one or more of mass, a radius, and a repulsion coefficient of the game objects.

S200: A moving module receives a moving instruction directed to the game group, and moves the game group towards a moving target.

S300: An interaction module calculates a repulsive force of each game object based on the collision attribute, and represents an interaction form of the game object based on the repulsive force.

S400: When the game group is moved to the moving target, the interaction module makes a group circle with a center of the game group as a center of the circle and a first length as a radius. When the game object is outside the group circle, it controls the collision module to impart a restoring force directing to the center of the circle to the game object, so as to control the game object to return to the game group.

The present disclosure further discloses a server. The server includes an interactive control system as shown in any of the above embodiments. And it further discloses a computer-readable storage medium on which a computer program is stored. When the computer program is executed by a processor, the processor implements the above steps.

A client can be implemented in various forms. For example, the terminal described in the present disclosure may include a client such as a mobile phone, a smart phone, a notebook computer, a PDA (personal digital assistant), a PAD (tablet computer), a PMP (portable multimedia player), a navigation device, and a fixed terminal such as a digital TV, a desktop computer. It is assumed that the terminal is a client. However, a person skilled in the art understands that, in addition to elements specifically used for movement, the configuration according to the embodiments of the present disclosure can also be applied to fixed-type terminals.

It should be noted that the embodiments of the present disclosure have better implementation and do not limit the present disclosure in any form. Any person skilled in the art may use the technical content disclosed above to change or modify to equivalent effective embodiments. However, any amendments or equivalent changes and modifications made to the above embodiments based on the technical essence of the present disclosure without departing from the content of the technical solution of the present disclosure still fall within the scope of the technical solution of the present disclosure.

What is claimed is:

1. An interactive control system for game objects, used to control interaction of at least one game group comprising at least two game objects, wherein the interactive control system comprises:
    a collision module, configured to assign a collision attribute to each game object, wherein the collision attribute comprises at least one or more of a deformation size, mass, a radius, and a repulsion coefficient of the game object;
    a moving module, configured to receive a moving instruction directed to a game group, and move the game group towards a moving target; and
    an interaction module, configured to be coupled to the collision module, calculate a repulsive force of each game object based on the collision attribute, and represent an interaction form of the game objects based on the repulsive force, and configured to be coupled to the moving module, wherein, when the game group is moved to the moving target, makes a group circle with a center of the game group as a center of the circle and a first length as a radius, when the game object is outside the group circle, it controls the collision module to impart a restoring force directing to the center of the circle to the game object, so as to control the game object to return to the game group.

2. The interactive control system according to claim 1, wherein,
    the interaction module calculates the repulsive force according to the following formula:

repulsive force=deformation size*repulsion coefficient*direction/mass, wherein the deformation size is a value of contour deformation generated when contours of different game objects are in contact;
    the repulsion coefficient is repulsion performance of each game object; and
    the mass is mass of a relative game object that is in contact with the game object.

3. The interactive control system according to claim 1, wherein,
    the interaction module calculates a first repulsive force between each game object and other game objects in the same game group, and a second repulsive force between each game object and game objects in a different game group, and calculates a resultant repulsive force based on the first repulsive force and the second repulsive force; and
    the interaction module simulates, when representing the interaction form of the game objects according to the resultant repulsive force, movements of the game objects under the resultant repulsive force, so that the game objects in the same game group or in different game groups do not clip through each other.

4. The interactive control system according to claim 1, wherein, the interactive control system further comprises:
    a combat module, configured to receive an attack instruction directed to an attacking game group and an attacked game group, and control the attacking game group to fight with the attacked game group, wherein the combat module randomly or directionally selects a game object in the attacked game group as an object of attack for each game object in the attacking game group; and
    the interaction module is coupled to the combat module, receives a relationship between the objects of attack, provides a combat interactive performance, and sends the combat interactive performance to at least one client for display.

5. The interactive control system according to claim 4, wherein,
    the combat interactive performance comprises one or more of attack actions, special effects, attacked actions, and damage data of the game objects; and
    when the combat module directionally selects at least two game objects in the attacked game group as objects of attack for the game objects in the attacking game group, the combat interactive performance further comprises an attack radius.

6. The interactive control system according to claim 1, wherein the interactive control system further comprises:
    a compensation module, configured to obtain an upper limit of objects of each game group and a current number of the game objects, and when the current number is less than the upper limit of objects, the compensation module controls an object center having the game objects to compensate the game objects for the game group.

7. A server, comprising the interactive control system according to claim 1.

8. An interactive control method for game objects, used to control interaction of at least one game group comprising at least two game objects, wherein the interactive control method comprises the following steps:
    assigning, by a collision module, a collision attribute to each game object, wherein the collision attribute comprises at least one or more of mass, a radius, and a repulsion coefficient of the game object;
    receiving, by a moving module, a moving instruction directed to the game group, and moving the game group towards a moving target;
    calculating, by an interaction module, a repulsive force of each game object based on the collision attribute, and representing an interaction form of the game objects based on the repulsive force;
    when the game group is moved to the moving target, making, by the interaction module, a group circle with a center of the game group as a center of the circle and a first length as a radius, when the game object is outside the group circle, it controls the collision module to impart a restoring force directing to the center of the circle to the game object, so as to control the game object to return to the game group.

9. A non-transitory computer-readable storage medium having a computer program stored thereon, wherein when the computer program is executed by a processor, the processor implements the steps according to claim 8.

10. A server comprising the interactive control system according to claim 2.

11. A server comprising the interactive control system according to claim 3.

12. A server comprising the interactive control system according to claim 4.

13. A server comprising the interactive control system according to claim 5.

14. A server comprising the interactive control system according to claim 6.

\* \* \* \* \*